(12) United States Patent
Yosui et al.

(10) Patent No.: US 11,588,382 B2
(45) Date of Patent: Feb. 21, 2023

(54) ACTUATOR AND METHOD OF MANUFACTURING ACTUATOR

(71) Applicant: Murata Manufacturing Co., Ltd., Nagaokakyo (JP)

(72) Inventors: Kuniaki Yosui, Nagaokakyo (JP); Shingo Ito, Nagaokakyo (JP); Naoki Gouchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 546 days.

(21) Appl. No.: 16/718,279

(22) Filed: Dec. 18, 2019

(65) Prior Publication Data

US 2020/0127549 A1 Apr. 23, 2020

Related U.S. Application Data

(63) Continuation of application No. PCT/JP2018/025218, filed on Jul. 3, 2018.

(30) Foreign Application Priority Data

Jul. 24, 2017 (JP) .............................. JP2017-142828

(51) Int. Cl.
*H02K 11/215* (2016.01)
*H02K 11/33* (2016.01)
(Continued)

(52) U.S. Cl.
CPC ........... *H02K 11/215* (2016.01); *H02K 11/33* (2016.01); *H02K 15/04* (2013.01); *H02K 41/0356* (2013.01)

(58) Field of Classification Search
CPC ........ H02K 3/26; H02K 11/33; H02K 11/215; H02K 41/033; H02K 15/04; H02K 41/0356; H02K 1/18; H02K 41/031; H02K 41/00; H02K 41/02; H02K 29/08; H01F 17/0013; G03B 5/00; H05K 1/181; H05K 3/4691; H05K 1/165; H01L 41/0475;
(Continued)

(56) References Cited

U.S. PATENT DOCUMENTS 5,357,158 A 10/1994 Takei
5,701,042 A 12/1997 Takei
(Continued)

FOREIGN PATENT DOCUMENTS

JP 48-28605 A 9/1973
JP 48-28605 B1 9/1973
(Continued)

OTHER PUBLICATIONS

Isogai et al, Hall Sensor Device and Position Detector, Nov. 10, 2016, JP 2016192516 (English Machine Translation) (Year: 2016).*
(Continued)

*Primary Examiner* — Alexander A Singh
(74) *Attorney, Agent, or Firm* — Keating & Bennett, LLP

(57) ABSTRACT

An actuator includes a coil substrate including a coil, a base substrate including a coil drive circuit, and a magnet to receive a magnetic field generated by the coil. A magnetic sensor is mounted on the coil substrate. The coil substrate on which the magnetic sensor is mounted is connected to the base substrate through a conductive bonding material.

20 Claims, 6 Drawing Sheets

(51) Int. Cl.
*H02K 15/04* (2006.01)
*H02K 41/035* (2006.01)

(58) Field of Classification Search
CPC ....... H01L 41/083; H01L 43/04; H01L 43/06; H01L 43/065; H01L 43/14; G01R 33/07; H01H 50/443
USPC .............................................. 310/68 R, 68 B
See application file for complete search history.

(56) References Cited

U.S. PATENT DOCUMENTS

| | | | |
|---|---|---|---|
| 5,867,357 A | | 2/1999 | Michel et al. |
| 7,816,905 B2 * | | 10/2010 | Doogue ............... G01R 15/207 |
| | | | 324/117 H |
| 9,869,729 B1 * | | 1/2018 | Ausserlechner ... G01R 33/0094 |
| 2006/0022543 A1 | | 2/2006 | Takeuchi |
| 2014/0333301 A1 * | | 11/2014 | Racz .................. G01R 19/0092 |
| | | | 324/251 |
| 2016/0012950 A1 * | | 1/2016 | Nishino ............. H02K 41/0356 |
| | | | 216/13 |
| 2018/0182953 A1 * | | 6/2018 | Makimura .............. H01L 43/04 |

FOREIGN PATENT DOCUMENTS

| | | | |
|---|---|---|---|
| JP | 53-147219 A | | 12/1978 |
| JP | 05-227729 A | | 9/1993 |
| JP | 08-140333 A | | 5/1996 |
| JP | 11-235067 A | | 8/1999 |
| JP | 2007-020266 A | | 1/2007 |
| JP | 2015-180157 A | | 10/2015 |
| JP | 2016-191849 A | | 11/2016 |
| JP | 2016192516 A | * | 11/2016 |
| WO | 2004/047252 A1 | | 6/2004 |

OTHER PUBLICATIONS

Official Communication issued in corresponding Japanese Patent Application No. 2019-532470, dated Feb. 2, 2021.
Official Communication issued in International Patent Application No. PCT/JP2018/025218, dated Oct. 9, 2018.
Official Communication issued in corresponding Japanese Patent Application No. 2019-532470, dated Oct. 27, 2020.

* cited by examiner

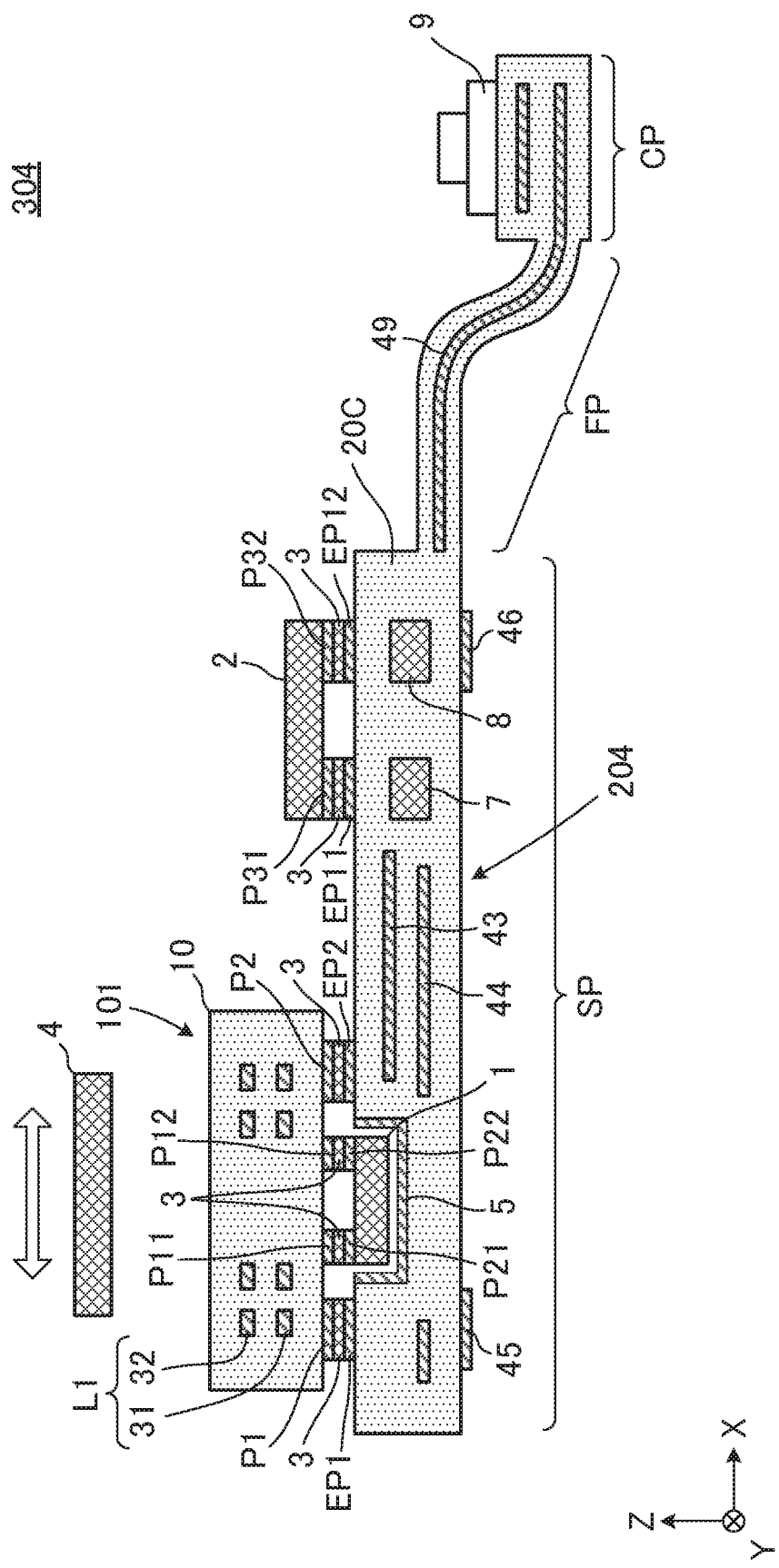

ACTUATOR AND METHOD OF MANUFACTURING ACTUATOR

CROSS REFERENCE TO RELATED APPLICATIONS

This application claims the benefit of priority to Japanese Patent Application No. 2017-142828 filed on Jul. 24, 2017 and is a Continuation Application of PCT Application No. PCT/JP2018/025218 filed on Jul. 3, 2018. The entire contents of each application are hereby incorporated herein by reference.

BACKGROUND OF THE INVENTION

1. Field of the Invention

The present invention relates to an actuator, and more particularly, to an actuator that moves one of a coil and a magnet by an interaction therebetween.

2. Description of the Related Art

In the related art, various actuators are known which include a coil and are driven by electromagnetic force. For example, JP 2016-191849 A discloses an actuator which includes a coil substrate including a coil, a base substrate to which the coil substrate is bonded, and a magnetic sensor mounted on the base substrate. This actuator moves a movable body provided with a magnet by a magnetic field generated by a coil.

However, the actuator disclosed in JP 2016-191849 A has a structure in which the coil substrate is mounted on the base substrate. Therefore, the mounting position of the coil substrate may be deviated from a predetermined place when the coil substrate is mounted on the base substrate, and thus the mounting position of the coil relative to the magnetic sensor may be deviated.

For example, the current flowing through the coil is controlled by a driver IC connected to the magnetic sensor based on information obtained from the magnetic sensor (a signal from the magnetic sensor). For this reason, when the mounting position of the coil relative to the magnetic sensor is deviated, the magnetic field detected by the magnetic sensor, the magnetic field generated by the coil, and the like may change from a specified state, resulting in variations in characteristics of the actuator.

SUMMARY OF THE INVENTION

Preferred embodiments of the present invention provide actuators which each include a coil substrate, a base substrate, and a magnetic sensor and which each reduce or prevent an individual difference in actuator characteristics by reducing or preventing a deviation in a positional relationship between a coil and a magnetic sensor.

An actuator according to a preferred embodiment of the present invention includes a coil substrate which includes a base material and a coil including a coil conductor provided inside the base material, the coil substrate including a magnetic sensor mounted on the base material; a base substrate including a coil drive circuit; and a magnet which receives a magnetic field generated by the coil, wherein the coil substrate is connected to the base substrate through a conductive bonding material.

In this configuration, the coil substrate including the magnetic sensor is mounted in advance on the base substrate through the conductive bonding material. Thus, when the coil substrate is mounted on the base substrate, the deviation in the positional relationship between the magnetic sensor and the coil hardly occurs. For this reason, compared to a case where the magnetic sensor and the coil substrate are each mounted on the base substrate, the position of the coil relative to the magnetic sensor is unlikely to be deviated from a predetermined position. Therefore, with this configuration, it is possible to reduce or prevent variations in the characteristics of the actuator caused by the positional deviation of the coil relative to the magnetic sensor.

In an actuator according to a preferred embodiment of the present invention, preferably, the actuator includes a shield conductor provided in contact with the base substrate, in which the shield conductor is disposed between another conductor pattern in contact with the base substrate and the magnetic sensor. In this configuration, the shield conductor is disposed between the other conductor pattern in contact with the base substrate and the magnetic sensor, and thus, the noise generated from the other conductor pattern is shielded by the shield conductor. Therefore, with this configuration, the influence of the noise generated from the base substrate on the magnetic sensor is reduced or prevented.

In an actuator according to a preferred embodiment of the present invention, the coil conductor may include a plurality of coil conductors, the base material may include a plurality of insulating base layers that are laminated, and the coil may include the plurality of coil conductors provided on two or more insulating base layers among the plurality of insulating base layers. In a case where the coil includes the plurality of coil conductors respectively provided on the two or more insulating base layers, it is necessary to laminate the plurality of insulating base layers (specifically, the plurality of coil conductors) with each other with high positional accuracy in order to reduce or prevent changes in characteristic of the coil. With this configuration, the coil substrate which is required to have high positional accuracy during laminating, and the base substrate are separate, and thus the yield rate of the actuator can be increased compared to a case where the coil substrate and the base substrate are integrally provided.

In an actuator according to a preferred embodiment of the present invention, preferably, the base material includes a mounting surface mounted on the base substrate, the magnet is disposed on an opposite side to the base substrate with the coil substrate interposed between the magnet and the base substrate, and the magnetic sensor is disposed at a position closer to the magnet with respect to the mounting surface. According to this configuration, the distance between the magnetic sensor and the magnet is short compared to a case where the magnetic sensor is mounted on the mounting surface, and thus, the magnetic field detection accuracy of the magnetic sensor relative to the magnet is improved.

In an actuator according to a preferred embodiment of the present invention, the coil drive circuit may include a driver IC disposed in contact with the base substrate, and the driver IC may be connected to the magnetic sensor and control a current flowing through the coil based on a signal from the magnetic sensor.

In an actuator according to a preferred embodiment of the present invention, preferably, the actuator further includes a capacitor in contact with the base substrate and connected between the driver IC and a ground. According to this configuration, compared to a case where the capacitor is mounted on the coil substrate, the wiring length between the driver IC and the capacitor or the wiring length between the capacitor and the ground can be shortened. For this reason, the inductance and the conductor resistance in the wiring between the driver IC and the capacitor or the inductance and the conductor resistance in the wiring between the capacitor and the ground can be reduced. The effect of reducing or preventing the voltage fluctuation of the driver IC caused by the capacitor is further improved.

In an actuator according to a preferred embodiment of the present invention, preferably, the base substrate includes a flexible portion having flexibility and an external connection portion connected to the flexible portion. With this configuration, the external connection portion can be easily connected to another substrate or the like using the flexibility of the flexible portion (in a state where the flexible portion is bent). In addition, according to this configuration, even in a case where an external force is applied to the connection portion (for example, a case where the other substrate or the like connected to the connection portion moves), a stress is not easily transmitted to the coil or the magnetic sensor. For this reason, it is possible to reduce or prevent the actuator characteristic changes resulting from the transmission of the stress to the coil and the magnetic sensor.

A method of manufacturing an actuator according to a preferred embodiment of the present invention which includes a coil substrate having a coil and a base material, a base substrate including a coil drive circuit, and a magnet which receives a magnetic field generated by the coil, the method includes a coil substrate forming process of forming the coil including a coil conductor formed inside the base material and mounting a magnetic sensor on the base material; and a substrate bonding process of connecting the coil substrate to the base substrate through a conductive bonding material after the coil substrate forming process.

According to the method, by reducing or preventing the deviation in the positional relationship between the coil and the magnetic sensor, the actuator that reduces or prevents individual differences in actuator characteristics can be easily manufactured.

In a method of manufacturing an actuator according to a preferred embodiment of the present invention, the base material may be formed by laminating a plurality of insulating base layers, and the coil substrate forming process may include a process of laminating the plurality of insulating base layers including the insulating base layer on which the magnetic sensor is mounted.

According to preferred embodiments of the present invention, in the actuators which each include the coil substrate, the base substrate, and the magnetic sensor, the actuator can be achieved which reduces or prevents a variation in individual characteristics by reducing or preventing a deviation in the positional relationship between the coil and the magnetic sensor.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a cross-sectional view of an actuator 304 according to a fourth preferred embodiment of the present invention.

DETAILED DESCRIPTION OF THE PREFERRED EMBODIMENT

Figure 1:
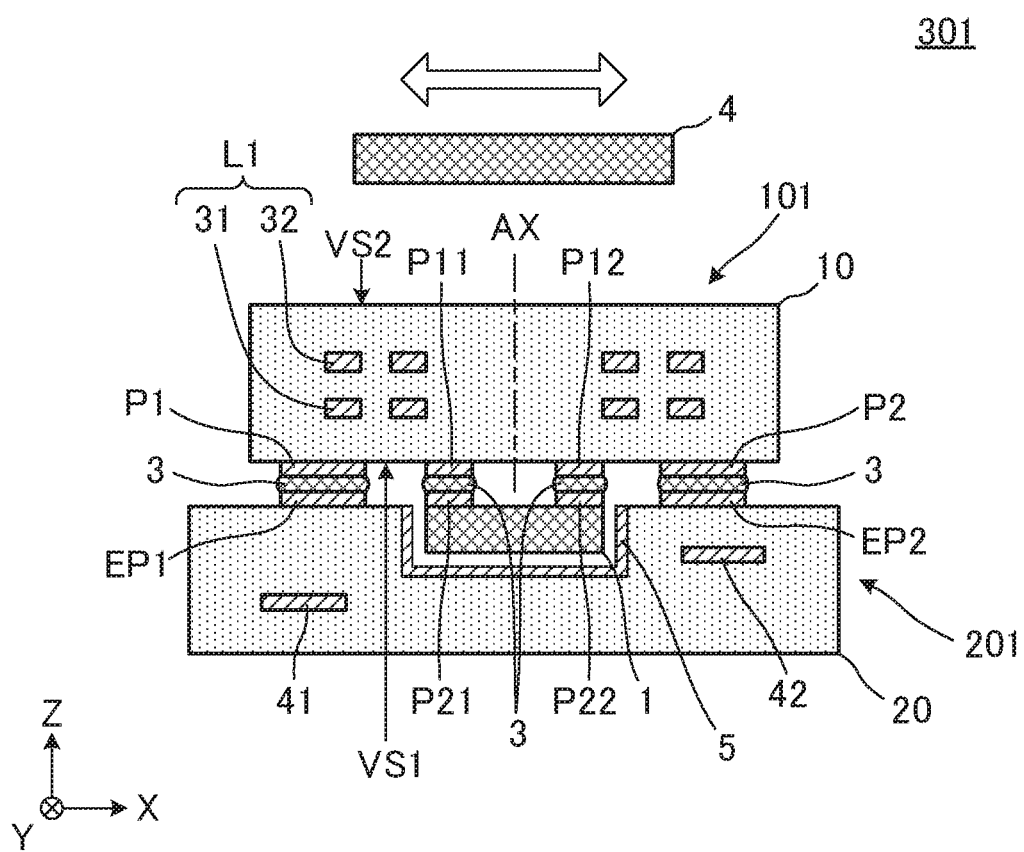
FIG. 1 is a cross-sectional view of an actuator 301 according to a first preferred embodiment of the present invention.

Hereinafter, several specific examples will be described with reference to the drawings to describe a plurality of preferred embodiments of the present invention. In the drawings, the same reference numerals are assigned to the same or similar elements or portions. In consideration of ease of explanation or understanding of the main points, the preferred embodiments are described separately, but the components described in different preferred embodiments can be partially replaced or combined. In second and subsequent preferred embodiments, descriptions of matters common to those in a first preferred embodiment are omitted, and only different points will be described. In particular, the same advantageous operational effects by the same or similar configurations will not be sequentially described for each preferred embodiment.

First Preferred Embodiment

Figure 2A:
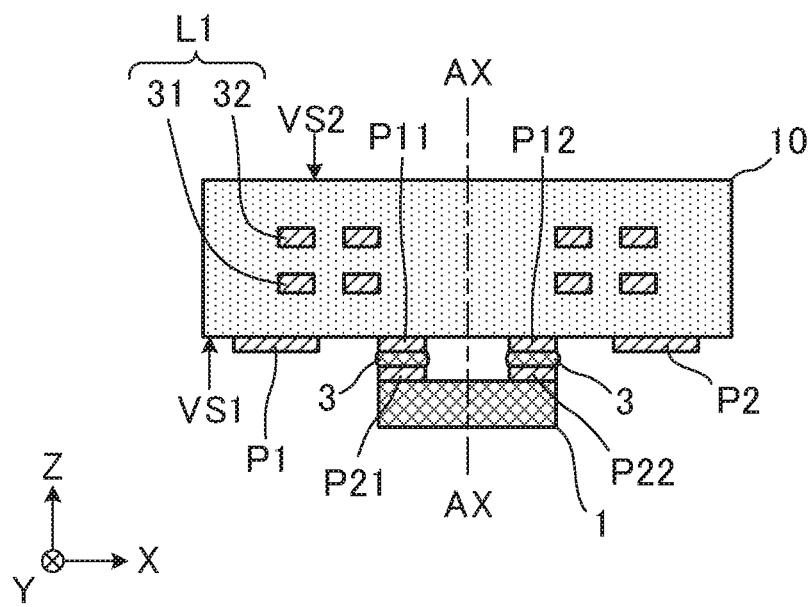
FIG. 2A is a cross-sectional view of a coil substrate 101 according to the first preferred embodiment of the present invention.
Figure 2B:
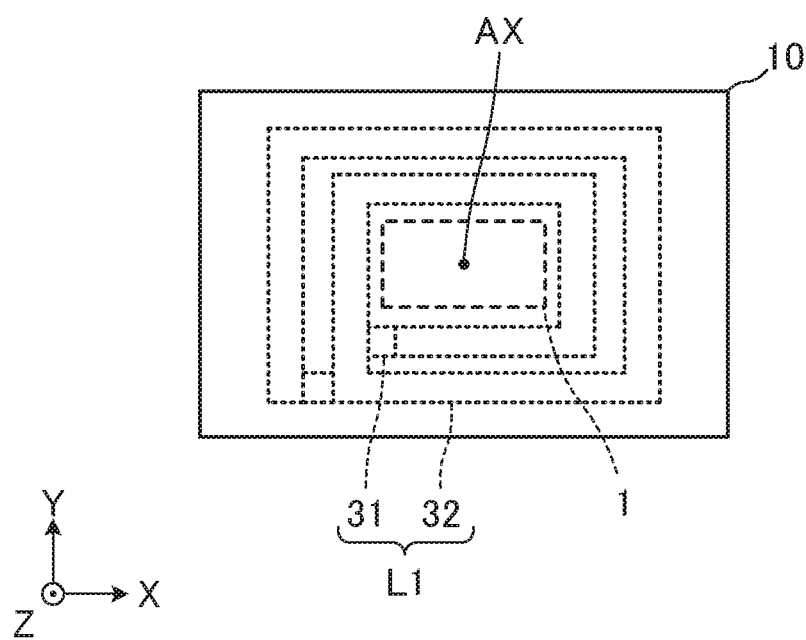
FIG. 2B is a plan view of the coil substrate 101.
Figure 3:
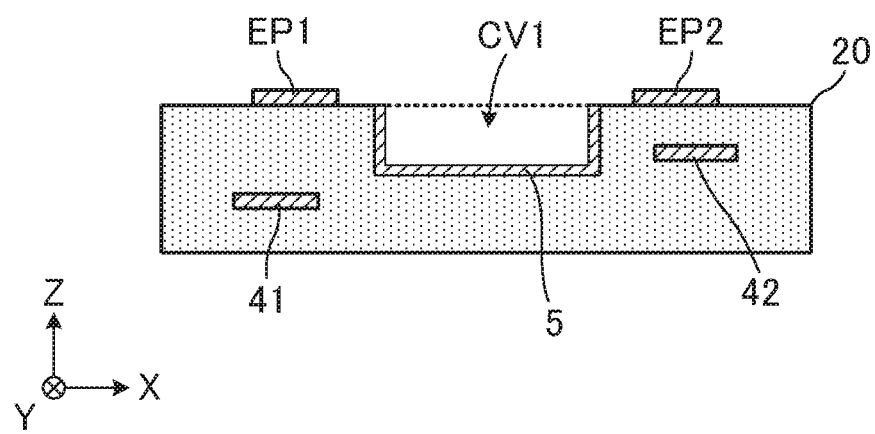
FIG. 3 is a cross-sectional view of a base substrate 201 according to the first preferred embodiment of the present invention.

FIG. 1 is a cross-sectional view of an actuator 301 according to a first preferred embodiment of the present invention. FIG. 2A is a cross-sectional view of a coil substrate 101 according to the first preferred embodiment, and FIG. 2B is a plan view of the coil substrate 101. FIG. 3 is a cross-sectional view of a base substrate 201 according to the first preferred embodiment. In FIGS. 1, 2A, and 3, the thickness of each element and portion is exaggerated. The same is also applied to cross-sectional views described below.

As will be described later in detail, an "actuator" of a preferred embodiment of the present invention includes a coil substrate including a coil and a base substrate and moves a movable body provided with a magnet by a magnetic field generated by the coil.

The actuator 301 includes the coil substrate 101, the base substrate 201, a magnet 4, and the like.

As illustrated in FIGS. 2A and 2B, the coil substrate 101 includes a base material 10, a coil L1, connection electrodes P1, P2, P11, and P12, a magnetic sensor 1, and the like.

The base material 10 is preferably a rectangular or substantially rectangular parallelepiped of which the longitudinal direction matches an X-axis direction, and includes a first main surface VS1 and a second main surface VS2 facing each other. The base material 10 is a laminated body formed by laminating a plurality of insulating base layers made of a thermoplastic resin. The base material 10 is preferably a rectangular or substantially rectangular parallelepiped of which the main material is, for example, liquid crystal polymer (LCP) or polyether ether ketone (PEEK).

In the present preferred embodiment, the first main surface VS1 of the base material 10 corresponds to a "mounting surface".

The coil L1 is, for example, an about four-turn coil which is provided inside the base material 10 and includes a winding axis AX along a laminating direction (Z-axis direction) of the plurality of insulating base layers. Specifically, the coil L1 includes coil conductors 31 and 32 and an interlayer connection conductor (not illustrated). The coil conductors 31 and 32 are preferably, for example, about two-turn rectangular or substantially rectangular spiral conductor patterns which are provided on different insulating base layers. A first end of the coil conductor 31 is connected to a first end of the coil conductor 32 via the interlayer connection conductor (not illustrated). The coil conductors 31 and 32 are preferably conductor patterns such as Cu foil, for example.

The connection electrodes P1, P2, P11, and P12 are preferably rectangular or substantially rectangular conductor patterns provided on the first main surface VS1 of the base material 10. The connection electrode P1 is connected to a first end of the coil L1 (a second end of the coil conductor 31), and the connection electrode P2 is connected to a second end of the coil L1 (a second end of the coil conductor 32). The connection electrodes P1, P2, P11, and P12 are preferably conductor patterns such as Cu foil, for example.

The magnetic sensor 1 is an element that senses a magnetic field generated when a current flows through the coil L1 or an external magnetic field and detects the amount of movement of the magnet 4. The magnetic sensor 1 is preferably a Hall element using a Hall effect (Hall effect sensor), for example.

The magnetic sensor 1 is provided on the first main surface VS1 of the base material 10. Specifically, the magnetic sensor 1 includes terminals P21 and P22 on the mounting surface (the upper surface of the magnetic sensor 1 in FIG. 2A), and the terminals P21 and P22 are connected to the connection electrodes P11 and P12 through the conductive bonding material 3, respectively. As illustrated in FIG. 2A, the magnetic sensor 1 is disposed at a position overlapping the winding axis AX of the coil L1. The conductive bonding material 3 is preferably, for example, solder.

The base substrate 201 includes a base material 20, a cavity CV1 provided in the base material 20, a shield conductor 5, connection electrodes EP1 and EP2 provided on the base material 20, conductor patterns 41 and 42, and the like. The base substrate 201 is in contact with a coil drive circuit to drive the coil L1.

The base material 20 is preferably a rectangular or substantially rectangular parallelepiped of which the longitudinal direction matches the X-axis direction. The base material 20 is a laminated body formed by laminating a plurality of insulating base layers made of a thermoplastic resin, for example. The base material 20 is preferably a rectangular or substantially rectangular parallelepiped of which the main material is preferably, for example, liquid crystal polymer (LCP) or polyether ether ketone (PEEK).

The cavity CV1 is an opening provided inward (toward a −Z direction) from the surface of the base material 20 (the upper surface of the base material 20 in FIG. 3). The planar shape of the cavity CV1 is a shape that matches the planar shape of the magnetic sensor 1. As will be described in detail later, the magnetic sensor 1 is disposed in the cavity CV1. The cavity CV1 is formed, for example, by forming the base material 20 and then performing etching with a laser from the surface side of the base material 20.

The shield conductor 5 is a box-shaped conductive member without a top surface and is fitted into the cavity CV1. The shield conductor 5 is obtained, for example, by forming a Cu flat plate by plastic deformation (forging).

The connection electrodes EP1 and EP2 are preferably rectangular or substantially rectangular conductor patterns provided on the surface of the base material 20 (the upper surface of the base material 20 in FIG. 3). The conductor patterns 41 and are provided inside the base material 20. The connection electrodes EP1 and EP2 and the conductor patterns 41 and 42 are preferably conductor patterns such as Cu foil, for example.

As illustrated in FIG. 1, the coil substrate 101 is connected to the base substrate 201 through the conductive bonding material 3. Specifically, the connection electrodes P1 and P2 of the coil substrate 101 are connected to the connection electrodes EP1 and EP2 of the base substrate 201 through the conductive bonding material 3.

In the present preferred embodiment, as illustrated in FIG. 1, the coil substrate 101 and the base substrate 201 are connected in a state where the magnetic sensor 1 provided on the coil substrate 101 (base material 10) is disposed in the cavity CV1. In addition, as illustrated in FIG. 1, the shield conductor 5 is disposed between other conductor patterns (conductor patterns 41 and 42) provided in contact with the base substrate 201 and the magnetic sensor 1.

The magnet 4 is attached to a movable body (not illustrated). The magnet 4 is disposed on the opposite side (+Z direction) to the base substrate 201 with the coil substrate 101 interposed therebetween. The magnet 4 is preferably a permanent magnet, for example.

The actuator 301 is used as follows, for example. When a predetermined current flows through the coil L1, the magnet 4 is displaced (see the white arrow in FIG. 1) in the plane direction (for example, the X-axis direction) by the magnetic field radiated from the coil L1. The magnetic sensor 1 senses a change in the magnetic field when the magnet 4 is displaced.

The actuator 301 according to the present preferred embodiment has the following advantageous effects.

(a) In the present preferred embodiment, the coil substrate 101 including the magnetic sensor 1 is mounted in advance on the base substrate 201 through the conductive bonding material 3. Thus, when the coil substrate 101 is mounted on the base substrate 201, the deviation in the positional relationship between the magnetic sensor 1 and the coil L1 hardly occurs. For this reason, compared to a case where the magnetic sensor 1 and the coil substrate 101 are separately mounted on the base substrate 201, the position of the coil L1 relative to the magnetic sensor is unlikely to be deviated from a predetermined position. Therefore, with this configuration, it is possible to reduce or prevent variations in the characteristics of the actuator caused by the positional deviation of the coil L1 relative to the magnetic sensor 1.

(b) In the present preferred embodiment, the shield conductor 5 is disposed between other conductor patterns (conductor patterns 41 and 42) in contact with the base substrate 201 and the magnetic sensor 1. According to this configuration, the noise generated from the other conductor patterns is shielded by the shield conductor 5. For this reason, the influence of the noise generated from the base substrate 201 on the magnetic sensor 1 can be reduced or prevented.

(c) In the present preferred embodiment, the magnetic sensor 1 is disposed at a position overlapping the winding axis AX of the coil L1. In this configuration, the magnetic sensor 1 is disposed on the winding axis AX of the coil L1 which is less affected by the magnetic field generated from the coil L1, and thus, it is unlikely to be affected by the magnetic field generated from the coil L1. For this reason, the magnetic field detection accuracy of the magnetic sensor 1 can be increased.

(d) In the present preferred embodiment, the base material 10 of the coil substrate 101 and the base material 20 of the base substrate 201 are made of the same main component material (liquid crystal polymer). With this configuration, the linear expansion coefficients of the base material 10 of the coil substrate 101 and the linear expansion coefficients of the base material 20 of the base substrate 201 match or substantially match each other. For this reason, the occurrence of warpage due to a difference in linear expansion coefficient between the base material 10 and the base material 20, resulting from a temperature change when the coil substrate 101 is mounted on the base substrate 201 (or after mounted) is reduced or prevented. Therefore, with this configuration, a bonding failure between the connection electrodes P1 and P2 of the coil substrate 101 and the connection electrodes EP1 and EP2 of the base substrate 201 is reduced or prevented.

Note that, in the present preferred embodiment, the base material 10 is a laminated body formed by laminating the plurality of insulating base layers, and the coil L1 includes a plurality of the coil conductors 31 and 32 provided on the two or more insulating base layers. In a case where the coil L1 includes the plurality of coil conductors 31 and 32 respectively provided on the two or more insulating base layers, it is necessary to laminate the plurality of insulating base layers (the plurality of coil conductors) with each other with high positional accuracy in order to reduce or prevent changes in coil characteristics. On the other hand, in the actuator 301 according to the present preferred embodiment, the coil substrate 101 which is required to have high positional accuracy during laminating, and the base substrate 201 are separate. For this reason, with this configuration, it is possible to increase the yield rate of actuators compared to a case where the coil substrate and the base substrate are integrally provided (a case where the coil substrate and the base substrate are made with one base material).

The actuator 301 according to the present preferred embodiment is manufactured, for example, by the following process.

(1) First, the coil substrate 101 in which the base material 10 is provided with the magnetic sensor 1 is prepared. Specifically, the coil substrate 101 is manufactured by the following process.

(1-1) First, a plurality of insulating base layers in an aggregate substrate state are prepared. The plurality of insulating base layers are preferably thermoplastic resin sheets such as liquid crystal polymer (LCP) or polyether ether ketone (PEEK), for example.

(1-2) Next, the coil conductors 31 and 32 and the connection electrodes P1, P2, P11, and P12 are respectively formed on the plurality of insulating base layers. Specifically, by laminating a metal foil (for example, Cu foil) on the main surface of the insulating base layer in the aggregate substrate state, and then patterning the metal foil by photolithography, the coil conductors 31 and 32 and the connection electrodes P1, P2, P11, and P12 and the like are formed.

The interlayer connection conductors are formed in the plurality of insulating base layers. The interlayer connection conductor is provided by forming a through hole in the insulating base layer with a laser or other suitable method, then applying a conductive paste including, for example, one or more of Cu, Sn, or the like or an alloy thereof, and curing (solidifying) the conductive paste through the subsequent heating and pressing shown later.

(1-3) Next, the plurality of insulating base layers are sequentially laminated. Thereafter, the plurality of laminated insulating base layers are heated and pressurized to form the base material 10 in the aggregate substrate state. By this process, the coil conductors 31 and 32 are connected through the interlayer connection conductor. The coil L1 is configured by the coil conductors 31 and 32 and the interlayer connection conductor.

(1-4) Next, the magnetic sensor 1 is provided on the base material 10. Specifically, the terminals P21 and P22 of the magnetic sensor 1 are connected to the connection electrodes P11 and P12 formed on the base material 10 through the conductive bonding material 3, respectively. The magnetic sensor 1 is preferably, for example, a Hall element using a Hall effect, and the conductive bonding material 3 is preferably, for example, solder. The magnetic sensor 1 is mounted on the base material 10 preferably by, for example, a reflow process.

The above process of mounting the magnetic sensor 1 on the base material 10 is an example of a "coil substrate forming process". Note that, the "coil substrate forming process" is not limited to this process. For example, the "coil substrate forming process" may be a process of obtaining the base material 10 provided with the magnetic sensor 1 when a plurality of insulating base layers including the insulating base layer on which the magnetic sensor 1 is mounted are laminated to be heated and pressurized.

(1-5) Thereafter, the coil substrate 101 is obtained by separating the aggregate substrate into individual pieces.

(2) Next, the coil substrate 101 is connected to the base substrate 201 through the conductive bonding material 3. Specifically, the connection electrodes P1 and P2 of the coil substrate 101 are connected to the connection electrodes EP1 and EP2 of the base substrate 201 through the conductive bonding material 3, respectively. The conductive bonding material 3 is preferably, for example, solder.

The above process of connecting the coil substrate 101 to the base substrate 201 through the conductive bonding material 3 is an example of a "substrate bonding process".

According to the above manufacturing method, by reducing or preventing the deviation in the positional relationship between the coil L1 and the magnetic sensor 1, the actuator that reduces or prevents individual differences in actuator characteristics can be easily manufactured.

According to the above manufacturing method, the coil substrate 101 (base material 10) can be easily formed by collectively pressing a plurality of laminated insulating base layers, thus reducing the number of manufacturing processes and the cost.

Note that, in the above manufacturing method, the method of obtaining the coil substrate 101 by providing the magnetic sensor 1 on the base material 10 and then separating the aggregate substrate into individual pieces is described. However, the method of manufacturing the coil substrate 101 is not limited to thereto. The magnetic sensor 1 may be mounted on the base material 10 after the aggregate substrate is separated into individual pieces.

Second Preferred Embodiment

In a second preferred embodiment of the present invention, an example of an actuator including a driver IC is described.

Figure 4A:
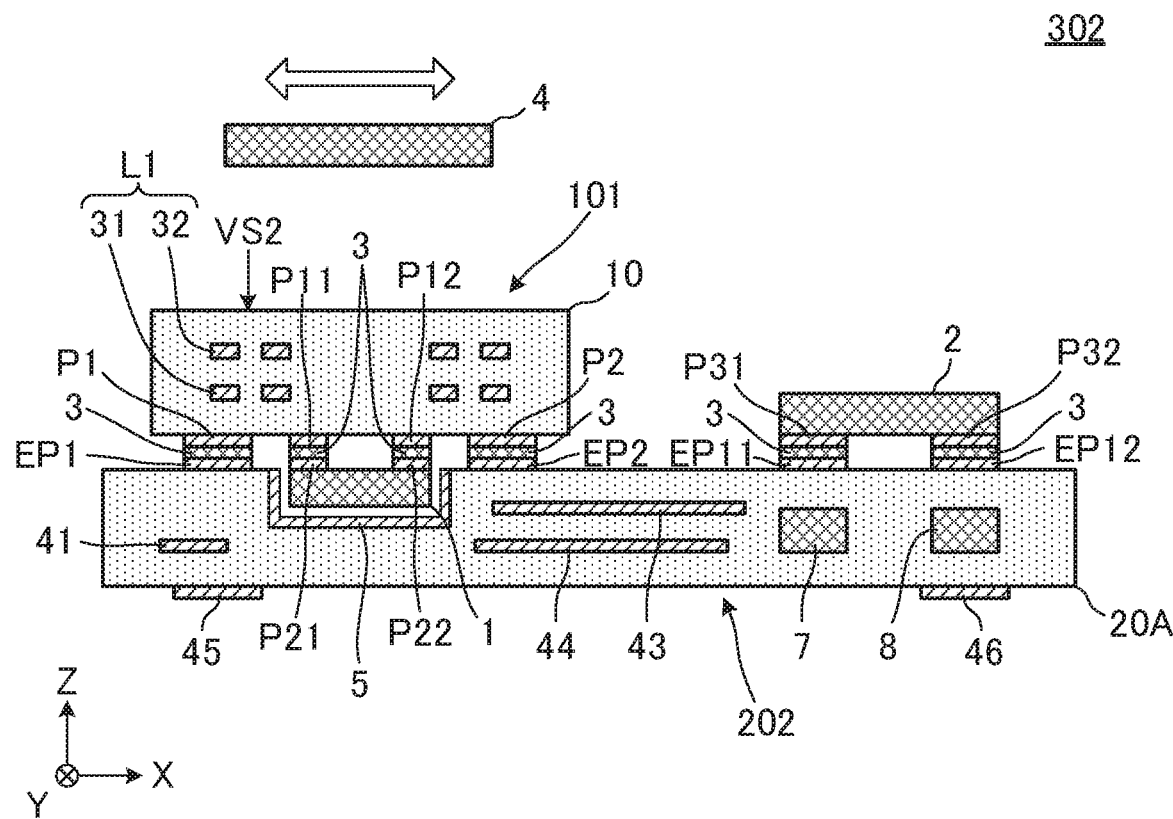
FIG. 4A is a cross-sectional view of an actuator 302 according to a second preferred embodiment.
Figure 4B:
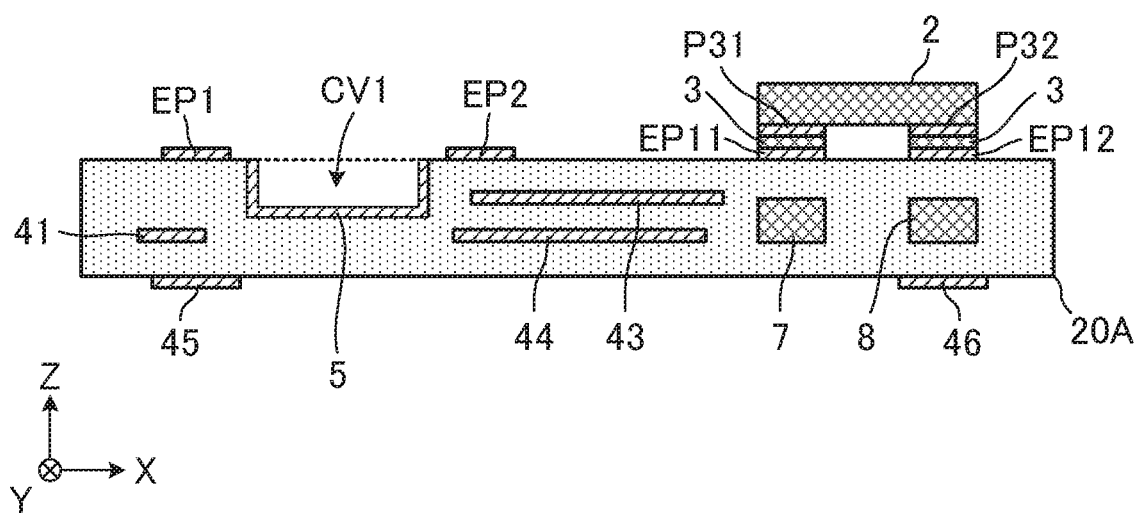
FIG. 4B is a cross-sectional view of a base substrate 202 according to the second preferred embodiment of the present invention.

FIG. 4A is a cross-sectional view of an actuator 302 according to the second preferred embodiment, and FIG. 4B is a cross-sectional view of a base substrate 202 according to the second preferred embodiment.

The actuator 302 includes the coil substrate 101, the base substrate 202, and the magnet 4. The coil substrate 101 and the magnet 4 are the same or substantially the same as those described in the first preferred embodiment.

The actuator 302 is different from the actuator 301 according to the first preferred embodiment in that the structure of the base substrate is different and a driver IC2 and capacitors 7 and 8 are further provided. Other configurations of the actuator 302 are the same or substantially the same as those of the actuator 301.

Hereinafter, portions different from the actuator 301 according to the first preferred embodiment will be described.

The base substrate 202 includes a base material 20A, the cavity CV1 provided in the base material 20A, the shield conductor 5, connection electrodes EP1, EP2, EP11, and EP12 provided on the base material 20A, conductor patterns 41, 43, 44, 45, and 46, the driver IC2, the capacitors 7 and 8, and the like. The cavity CV1, the shield conductor 5, the connection electrodes EP1 and EP2, and the conductor patterns 41 and 42 are the same or substantially the same as those described in the first preferred embodiment.

The base material 20A is longer in the longitudinal direction (X-axis direction) than the base material 20 of the base substrate 201 according to the first preferred embodiment. Other configurations of the base material 20A are the same or substantially the same as those of the base material 20.

The connection electrodes EP11 and EP12 are preferably rectangular or substantially rectangular conductor patterns provided on the surface of the base material 20A (the upper surface of the base material 20A in FIG. 4B). The conductor patterns 43 and 44 are provided inside the base material 20A. The conductor patterns 45 and 46 are provided on the back surface of the base material 20A (the lower surface of the base material 20A in FIG. 4B). The connection electrodes EP11 and EP12 and the conductor patterns 43, 44, 45, and 46 are preferably Cu foil, for example.

The driver IC2 is connected to the magnetic sensor 1 and controls a current flowing through the coil L1 based on a signal from the magnetic sensor 1. As illustrated in FIG. 4B, the driver IC2 is mounted on the base material 20A. Specifically, terminals P31 and P32 of the driver IC2 are connected to the connection electrodes EP11 and EP12 provided on the surface of the base material 20A through the conductive bonding material 3.

The capacitors 7 and 8 are mounted inside the base material 20A and are disposed in the vicinity of the driver IC2. The capacitors 7 and 8 are electrically connected between the driver IC2 and the ground of the base substrate 202 (base material 20A). The capacitors 7 and 8 are preferably, for example, chip capacitors.

The base substrate 202 includes a coil drive circuit for driving the coil L1. The coil drive circuit according to the present preferred embodiment includes the driver IC2, the capacitors 7 and 8, a wiring that connects the driver IC2 and the coil L1, a wiring that connects the capacitor 7 or 8 and the driver IC2, and the like.

As illustrated in FIG. 4A, the coil substrate 101 is connected to the base substrate 202 through the conductive bonding material 3.

The actuator 302 according to the present preferred embodiment has the following advantageous effects in addition to the advantageous effects described in the first preferred embodiment.

(e) In the present preferred embodiment, the actuator 302 according to the present preferred embodiment includes the capacitors 7 and 8 connected between the driver IC2 and the ground of the base substrate 202, and thus the voltage fluctuation of the driver IC2 can be reduced or prevented.

(f) In the present preferred embodiment, the driver IC2 and the capacitors 7 and 8 are mounted on the base substrate 202 including the coil drive circuit. By mounting the driver IC2 on the base substrate 202, the wiring length of the power supply wiring to the driver IC2 can be shortened compared to a case where the driver IC2 is mounted on the coil substrate 101, so that a low-loss coil drive circuit can be achieved. In addition, when the driver IC2 is mounted on the base substrate 202, the ground potential of the driver IC2 can be stabilized more easily compared to a case where the driver IC2 is mounted on the coil substrate 101.

According to this configuration, compared to a case where the capacitors 7 and 8 are mounted on the coil substrate 101, the wiring length between the driver IC2 and the capacitor 7 or 8 (or the wiring length between the capacitor 7 or 8 and the ground of the base substrate 202) can be shortened. For this reason, the inductance and the conductor resistance in the wiring between the driver IC2 and the capacitor 7 or 8 (or the inductance and the conductor resistance in the wiring between the capacitor 7 or 8 and the ground of the base substrate 202) can be reduced. The effect of reducing or preventing the voltage fluctuation of the driver IC2 caused by the capacitors 7 and 8 is further improved.

Note that, in the present preferred embodiment, the example in which the capacitors 7 and 8 are mounted inside the base substrate 202 (base material 20A) is described. However, preferred embodiments of the present invention are not limited to this configuration. The capacitors 7 and 8 may be mounted on the surface of the base substrate 202 (base material 20A). In addition, the number of capacitors is not limited to two and may be one or three or more, for example. Furthermore, the capacitors 7 and 8 are not limited to chip capacitors (chip components). For example, the capacitors 7 and 8 may be interlayer capacitors provided between the conductor patterns facing each other and being disposed on a plurality of insulating base layers.

Third Preferred Embodiment

In a third preferred embodiment of the present invention, an example in which a cavity is provided in a coil substrate is described.

Figure 5A:
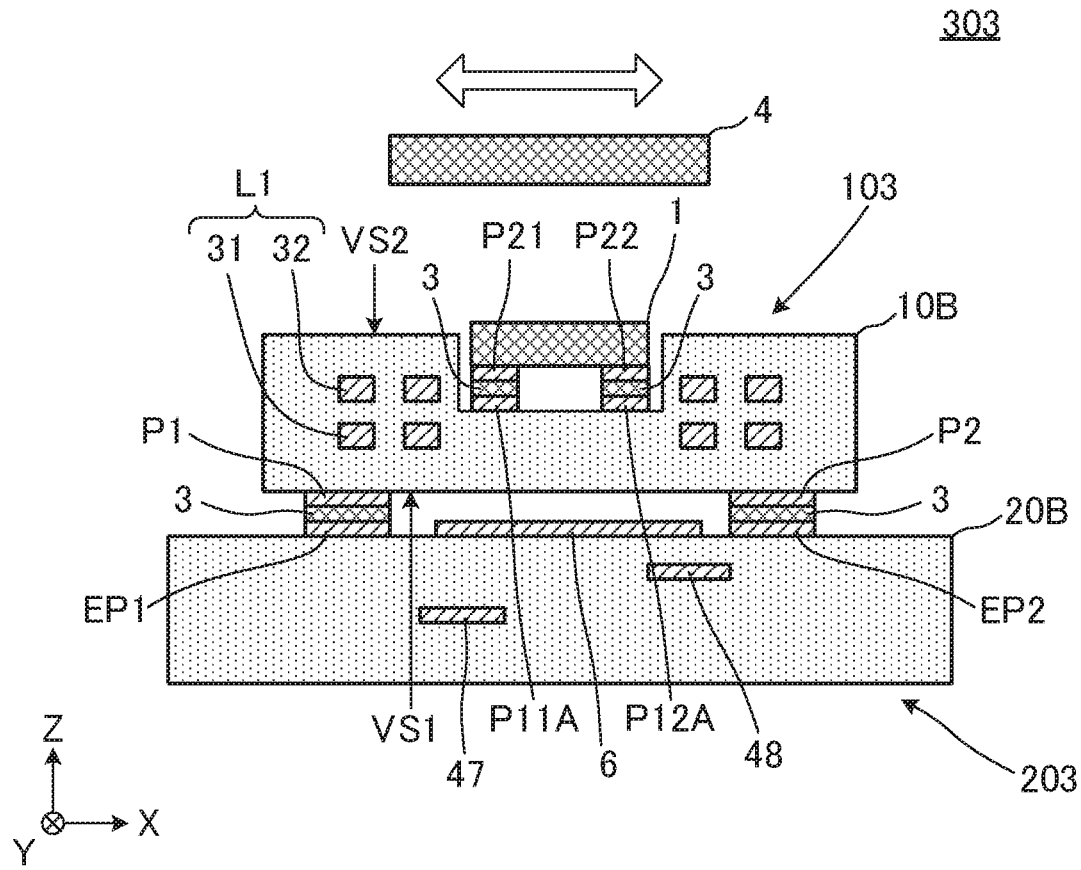
FIG. 5A is a cross-sectional view of an actuator 303 according to a third preferred embodiment.
Figure 5B:
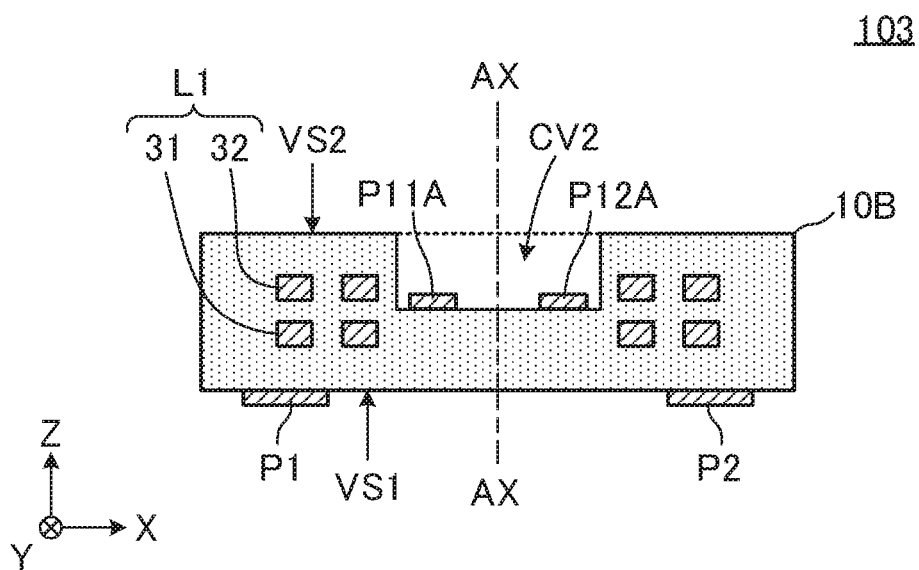
FIG. 5B is a cross-sectional view of a coil substrate 103 according to the third preferred embodiment of the present invention.

FIG. 5A is a cross-sectional view of an actuator 303 according to the third preferred embodiment, and FIG. 5B is a cross-sectional view of a coil substrate 103 according to the third preferred embodiment. In FIG. 5B, for easy understanding of the structure, the magnetic sensor 1 is not illustrated.

The actuator 303 includes the coil substrate 103, a base substrate 203, and the magnet 4. The magnet 4 is the same or substantially the same as that described in the first preferred embodiment.

The actuator 303 is different from the actuator 301 according to the first preferred embodiment in that the cavity is provided in the coil substrate. The actuator 303 is different from the actuator 301 in that the cavity is not provided in the base substrate. Other configurations of the actuator 303 are the same or substantially the same as those of the actuator 301.

Hereinafter, portions different from the actuator 301 according to the first preferred embodiment will be described.

The coil substrate 103 includes a base material 10B, a cavity CV2 provided in the base material 10B, the coil L1, connection electrodes P1, P2, P11A, and P12A, the magnetic sensor 1, and the like. The coil L1, the connection electrodes P1 and P2, and the magnetic sensor 1 are the same or substantially the same as those described in the first preferred embodiment.

The base material 10B is different from the base material 10 described in the first preferred embodiment in that the cavity CV2 is provided. The cavity CV2 is an opening provided inwardly (toward the −Z direction) from the second main surface VS2 of the base material 10B. The planar shape of the cavity CV2 matches the planar shape of the magnetic sensor 1. As will be described in detail later, the magnetic sensor 1 is disposed in the cavity CV2.

As illustrated in FIG. 5B, the connection electrodes P11A and P12A are provided on the bottom surface of the cavity CV2. The connection electrodes P11A and P12A are preferably rectangular or substantially rectangular conductor patterns and are conductor patterns such as Cu foil, for example.

The magnetic sensor 1 is disposed in the cavity CV2 of the base material 10B and is mounted on the bottom surface of the cavity CV2. Specifically, the terminals P21 and P22 of the magnetic sensor 1 are connected to the connection electrodes P11A and P12A through the conductive bonding material 3, respectively.

In the present preferred embodiment, as illustrated in FIG. 5A, the magnetic sensor 1 is disposed at a position closer to the magnet 4 than to the first main surface VS1 (mounting surface) (position in the +Z direction from the mounting surface). In addition, in the present preferred embodiment, the magnetic sensor 1 is disposed inside the coil opening of the coil L1.

The base substrate 203 includes a base material 20B, a shield conductor 6, the connection electrodes EP1 and EP2, and conductor patterns 47 and 48. The connection electrodes EP1, EP2 are the same or substantially the same as those described in the first preferred embodiment.

The base material 20B is different from the base material 20 described in the first preferred embodiment in that the cavity is not provided. Other configurations of the base material 20B are the same or substantially the same as those of the base material 20. The conductor patterns 47 and 48 are provided inside the base material 20B. The conductor patterns 47 and 48 are preferably Cu foil, for example.

The shield conductor 6 is a conductor pattern provided on the surface of the base material 20B (the upper surface of the base material 20B in FIG. 5B). As illustrated in FIG. 5A, the shield conductor 6 is disposed between other conductor patterns (conductor patterns 47 and 48) in contact with the base substrate 203 and the magnetic sensor 1. The shield conductor 6 is preferably a conductor pattern such as Cu foil, for example.

The actuator 303 according to the present preferred embodiment has the following advantageous effects in addition to the advantageous effects described in the first preferred embodiment.

(g) In the present preferred embodiment, the magnetic sensor 1 is disposed at a position closer to the magnet 4 than to the first main surface VS1 (mounting surface). According to this configuration, the distance between the magnetic sensor 1 and the magnet 4 is short compared to a case where the magnetic sensor 1 is mounted on the first main surface VS1, and thus, the magnetic field detection accuracy of the magnetic sensor 1 relative to the magnet 4 can be improved.

(h) In the present preferred embodiment, the magnetic sensor 1 is disposed in the cavity CV2 and is disposed inside the coil opening of the coil L1. According to this configuration, the coil substrate on which the magnetic sensor 1 is mounted can be reduced in size (particularly, the thickness in the Z-axis direction can be reduced).

Note that, the magnetic sensor 1 may be mounted on the second main surface VS2 (top surface) of the base material 10B. In this case, the distance between the magnetic sensor 1 and the magnet 4 is further shortened, and the magnetic field detection accuracy of the magnetic sensor 1 relative to the magnet 4 can be further improved (see (g) above).

Fourth Preferred Embodiment

In a fourth preferred embodiment of the present invention, an example is described in which the base substrate includes a flexible portion.

FIG. 6 is a cross-sectional view of an actuator 304 according to the fourth preferred embodiment.

The actuator 304 includes the coil substrate 101, a base substrate 204, and the magnet 4. The coil substrate 101 is the same or substantially the same as that described in the first and second preferred embodiments.

The actuator 304 is different from the actuator 302 according to the second preferred embodiment in the configuration of the base substrate. Other configurations of the actuator 304 are the same or substantially the same as those of the actuator 302.

Hereinafter, portions different from the actuator 302 according to the second preferred embodiment will be described.

The base substrate 204 is different from the base substrate 202 in that the base substrate 204 further includes a base material 20C, a conductor pattern 49, a connector 9, and the like.

The base material 20C is different from the base material 20A described in the second preferred embodiment in that the base material 20C includes a flexible portion FP having flexibility and an external connection portion CP connected to the flexible portion FP. Other configurations of the base material 20C are the same or substantially the same as those of the base material 20A.

The number of the insulating base layers of the flexible portion FP of the base material 20C is smaller than the number of the insulating base layers of other portions (component mounting portion SP and external connection portion CP). For this reason, the flexible portion FP is easier to bend than other portions and has flexibility.

The conductor pattern 49 is provided inside the base material 20C and is disposed over the flexible portion FP and the connection portion CP. The connector 9 is mounted on the surface of the base material 20C at the external connection portion CP (the upper surface of the base material 20C at the external connection portion CP in FIG. 6).

The actuator 304 according to the present preferred embodiment has the following advantageous effects in addition to the advantageous effects described in the second preferred embodiment.

(i) In the present preferred embodiment, the base substrate 204 includes the flexible portion FP having flexibility and the external connection portion CP connected to the flexible portion FP. With this configuration, the connection portion CP can be easily connected to another substrate or the like by using the flexibility of the flexible portion FP (in a state where the flexible portion FP is bent).

(j) Further, according to the above configuration, the external connection portion CP can be connected to another substrate or the like through the flexible portion FP having flexibility, and thus even in a case where an external force is applied to the external connection portion CP (for example, a case where the other substrate to be connected to the external connection portion CP moves), a stress is not easily transmitted to the component mounting portion SP, the coil L1, or the magnetic sensor 1. For this reason, it is possible to reduce or prevent the actuator characteristic changes (characteristic changes associated with the deformation of the coil L1 or the like) resulting from the transmission of the stress to the coil L1, the magnetic sensor 1, and the like.

Note that, the number, position, length, and the like of the flexible portion FP and the external connection portion CP are not limited to the configuration described in the present preferred embodiment and can be changed as appropriate within the scope of operations and features of the present invention.

Other Preferred Embodiments

In each of the preferred embodiments described above, an example is described in which the base materials 10 and 10B of the coil substrate and the base materials 20, 20A, and 20B of the base substrate are preferably rectangular or substantially rectangular parallelepipeds. However, the present invention is not limited to this configuration. The shapes of the base material of the coil substrate and the base material of the base substrate can be appropriately changed within the scope of operations and features of the present invention. In addition, the planar shape of the base material is not limited to a rectangular or substantially rectangular shape and may be, for example, a polygon, a circle, an ellipse, a crank, an L shape, a T shape, a Y shape, or the like.

In each of the preferred embodiments described above, an example is described in which the base material of the coil substrate and the base material of the base substrate are preferably formed by laminating a plurality of insulating base layers mainly made of a thermoplastic resin. However, the present invention is not limited to this configuration. The number of the plurality of insulating base layers of the base material can be appropriately changed within the scope of operations and features of the present invention. In addition, the base material of the coil substrate and the base material of the base substrate are not limited to a laminated body and may be a single layer, for example. In addition, the base material may be formed by laminating a plurality of insulating base layers made of, for example, a thermosetting resin.

In each of the preferred embodiments described above, an example is described in which the coil L1 provided in the coil substrate is an about four-turn coil having the winding axis AX along the Z-axis direction. However, the number, position, shape, structure, size, and turn number of the coil or the like is not limited thereto. The number, shape, structure, and turn number of the coil can be changed as appropriate within the scope of operations and features of the present invention. For example, the coil may have a helical shape in which a plurality of looped coil conductor patterns are connected by interlayer connection conductor. In addition, the outer shape of the coil (the outer shape of the coil as viewed from the winding axis AX direction (Z-axis direction)) can be changed as appropriate within the scope of operations and features of the present invention and may be a polygon, a circle, an ellipse, or the like. In addition, the winding axis AX of the coil does not necessarily completely coincide with the Z-axis direction.

In each of the preferred embodiments described above, an example is described in which the coil L1 is provided inside the base material of the coil substrate. However, the present invention is not limited to this configuration. A portion of the coil may be provided on the surface of the base material.

Further, in each of the preferred embodiments described above, an example is described in which the coil L1 includes the coil conductors 31 and 32 respectively provided on the two insulating base layers. However, the present invention is not limited to this configuration. The coil may be defined by, for example, a single coil conductor. In addition, the coil may include two coil conductors respectively provided on both surfaces of a single insulating base layer, for example. Furthermore, the coil may include, for example, three or more coil conductors respectively provided on three or more insulating base layers.

Note that, the circuit configuration of the coil substrate and the circuit configuration of the base substrate are not limited to the configurations described in the above-described preferred embodiments. The circuit configuration of the coil substrate and the circuit configuration of the base substrate can be appropriately changed within the scope of operations and features of the present invention. For example, surface mounting components other than the magnetic sensor 1 may be mounted in contact with the coil substrate. In addition, for example, the surface mounting components other than the driver IC2 and the capacitors 7 and 8 may be mounted in contact with the base substrate. Further, the coil substrate and the base substrate may include, for example, a capacitor defined by conductor patterns and various transmission lines (strip line, microstrip line, meander, coplanar, or the like).

In each of the preferred embodiments described above, an example is described in which the base material of the coil substrate and the base material of the base substrate are made of the same main component material. However, the present invention is not limited to this configuration. The base material of the coil substrate and the base material of the base substrate may be made of different main component materials. However, it is preferable that the base material of the coil substrate and the base material of the base substrate are made of the same main component material from the viewpoint of the advantageous operational effect described in (d) above.

In each of the preferred embodiments described above, an example is described in which the connection electrodes P1, P2, P11, P11A, P12, and P12A of the coil substrate are rectangular or substantially rectangular conductor patterns. However, the present invention is not limited to this configuration. In each of the preferred embodiments described above, the example is described in which the connection electrodes EP1, EP2, EP11, and EP12 of the base substrate are rectangular or substantially rectangular conductor patterns. However, the present invention is not limited to this configuration. The shape, number, and position of the connection electrode of the coil substrate or the connection electrode of the base substrate can be changed as appropriate within the scope of operations and features of the present invention. The number of connection electrodes can be changed as appropriate depending on the circuit configuration formed in contact with the coil substrate or the base substrate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An actuator comprising:
   a coil substrate that includes a base material and a coil including a coil conductor inside the base material;
   a base substrate including a coil drive circuit;
   a magnet to receive a magnetic field generated by the coil; and
   a magnetic sensor provided on the base material; wherein
   the coil substrate is connected to the base substrate through a conductive bonding material.

2. The actuator according to claim 1, further comprising:
   a shield conductor in contact with the base substrate; wherein
   the shield conductor is disposed between another conductor pattern in contact with the base substrate and the magnetic sensor.

3. The actuator according to claim 2, wherein
   the base substrate includes a cavity;
   the magnetic sensor is disposed in the cavity; and
   the shield conductor is disposed in the cavity between the base substrate and the magnetic sensor.

4. The actuator according to claim 3, wherein the shield conductor is defined by a box-shaped conductor without a top surface.

5. The actuator according to claim 1, wherein
   the coil conductor includes a plurality of coil conductors;
   the base material includes a plurality of insulating base layers that are laminated; and
   the coil includes the plurality of coil conductors provided on two or more insulating base layers among the plurality of insulating base layers.

6. The actuator according to claim 5, wherein
   the base material includes a mounting surface mounted on the base substrate;
   the magnet is disposed on an opposite side to the base substrate with the coil substrate interposed between the magnet and the base substrate; and
   the magnetic sensor is disposed at a position closer to the magnet with respect to the mounting surface.

7. The actuator according to claim 5, wherein the coil is an about four-turn coil including a winding axis along a laminating direction of the plurality of insulating base layers.

8. The actuator according to claim 7, wherein the magnetic sensor is disposed at a position overlapping the winding axis of the coil.

9. The actuator according to claim 5, wherein the each of the plurality of coil conductors are about two-turn rectangular or substantially rectangular spiral conductor patterns.

10. The actuator according to claim 5, wherein each of the plurality of coil conductors are made of Cu foil.

11. The actuator according to claim 5, wherein the plurality of insulating base layers are made of thermoplastic resin.

12. The actuator according to claim 11, wherein a main material of the plurality of insulating base layers is liquid crystal polymer or polyether ether ketone.

13. The actuator according to claim 1, wherein
    the coil drive circuit includes a driver IC disposed in contact with the base substrate; and
    the driver IC is connected to the magnetic sensor and controls a current flowing through the coil based on a signal from the magnetic sensor.

14. The actuator according to claim 13, further comprising a capacitor in contact with the base substrate and connected between the driver IC and a ground.

15. The actuator according to claim 1, wherein the base substrate includes a flexible portion having flexibility and an external connection portion connected to the flexible portion.

16. The actuator according to claim 1, wherein the magnetic sensor is a Hall effect sensor.

17. The actuator according to claim 1, wherein
    the base substrate includes a cavity; and
    the magnetic sensor is disposed in the cavity.

18. The actuator according to claim 1, wherein
    the coil substrate includes a cavity in the base material layer; and
    the magnetic sensor is disposed in the cavity.

19. A method of manufacturing an actuator that includes a coil substrate including a coil and a base material, a base substrate including a coil drive circuit, and a magnet that receives a magnetic field generated by the coil, the method comprising:
    a coil substrate forming process of forming the coil including a coil conductor provided inside the base material and providing a magnetic sensor on the base material; and
    a substrate bonding process of connecting the coil substrate to the base substrate through a conductive bonding material after the coil substrate forming process.

20. The method according to claim 19, wherein
    the base material is formed by laminating a plurality of insulating base layers; and
    the coil substrate forming process includes a process of laminating the plurality of insulating base layers including the insulating base layer on which the magnetic sensor is mounted.

* * * * *